United States Patent Office 3,518,297
Patented June 30, 1970

3,518,297
N-(ACETYLSALICYL)ANTHRANILIC
ACID COMPOUNDS
Rosario Busacca, Milan, Italy, assignor, by mesne assignments, to Pharmirex Anstalt, Schaan, Liechtenstein, a Liechtenstein body corporate
No Drawing. Filed June 12, 1967, Ser. No. 645,532
Claims priority, application Great Britain, June 13, 1966, 26,286/66
Int. Cl. A61k 27/00; C07c 69/14
U.S. Cl. 260—480          2 Claims

ABSTRACT OF THE DISCLOSURE

N-(acetylsalicyl)anthranilic acid and its salts are useful in reducing inflammation, pain and fever.

---

This invention relates to anthranilic acid derivatives, their manufacture, and pharmaceutical compositions containing the same.

The invention provides N-(acetylsalicyl)anthranilic acid of the formula:

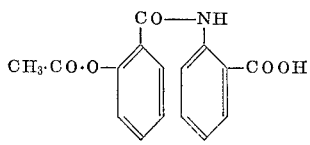

and its non-toxic, pharmaceutically acceptable salts. This compound may also be called 2-acetoxy-N-(2'-carboxyphenyl)-benzamide and is hereinafter referred to simply as "Benzacyl" for reasons of convenience. This new compound forms colourless or white crystals. It is soluble in methanol, ethanol, benzene, acetone, ether, and dioxane, insoluble in water, and soluble in solutions of alkali metal hydroxides and carbonates. Its melting point is 154–156° C. and its nitrogen content is 4.68%.

Benzacyl has interesting pharmacodynamic properties and more particularly has antipyretic, analgesic and anti-inflammatory effects.

It is prepared in accordance with the feature of the invention by condensing acetylsalicyloyl chloride with anthranilic acid in the presence of an acid binding agent. The reaction preferably takes place in the presence of excess anthranilic acid as acid binding agent and in an anhydrous acetone medium. The excess of anthranilic acid (1 mole more than the theoretical amount) serves as an acceptor for the hydrochloric acid formed during the reaction. The anthranilic acid hydrochloride formed is insoluble in the reaction solvent and precipitates. At the end of the reaction this precipitate is filtered off. The anthranilic acid may be recovered for use by dissolving the precipitate in water and adding alkai (5 N NaOH solution) to the solution to a pH of 5.

The preparation of Benzacyl is illustrated in the following example.

EXAMPLE I (a) Preparation of acetylsalicyloyl chloride 300 g. (1.66 M) of acetylsalicylic acid are introduced into a three litre, three-necked flask fitted with a sealed mechanical stirrer, a thermometer, a dropping funnel and a reflux condenser connected to an absorption trap for acid vapours, and 1000 ml. of anhydrous benzene are added. The stirrer is started and the mixture heated on a water bath to 65° C. Once this temperature has been reached, 400 g. (3.36 M) of thionyl chloride are added dropwise over a period of 40 to 45 minutes. When the chloride addition is complete, the temperature of the bath is raised to 95° C. and the reaction mixture is maintained under reflux for one and a half hours. The reflux condenser is then replaced by a distillation condenser and the distillation of the excess thionyl chloride and benzene is started at atmospheric pressure. When the greater part of the benzene has been distilled, the distillation residue is poured into a Claisen flask fitted with a small Vigreux distillation column, and is distilled in vacuo. The fraction distilling at 106–110° C. under a pressure of 4–5 mm. of mercury is collected. 275 g. of the desired product are thus obtained, 83% of theory.

(b) Preparation of Benzacyl 725 ml. of anhydrous acetone and 230 g. (1.67 M) of anthranilic acid are poured into a two litre, three-necked flask fitted with a sealed mechanical stirrer, a thermometer, a dropping funnel and a reflux condenser. The stirrer is started, the solution heated to 30° C., and 166 g. (about 0.84 M) of acetylsalicyloyl chloride are added dropwise from the dropping funnel over the course of 15 to 20 minutes. During this addition, a precipitate of anthranilic acid hydrochloride forms in the reaction mixture. When the addition of the acid chloride is complete, the reaction mixture is heated for one and a half hours, and then cooled, and suction filtered, taking care to collect all the precipitate on the filter, using a little acetone. The residue on the filter is washed two to three times with 1000 ml. of acetone each time, and mixed with the wash water and the filtrate. The acetone solution is diluted with water to a final volume of almost two litres and after adding 10 g. of decolourising charcoal, the solution is heated to boiling. The solution is left in contact with the charcoal at the boil for several minutes, and is then filtered through paper on a double-wall funnel heated to 60° C. The filtrate, from which Benzacyl starts to separate out in the form of white crystals, is cooled by shaking under running water and the cooling is maintained for several hours. The mixture is suction filtered and the crystalline product is washed two or three times on the filter with 50 ml. at a time of 50% aqueous acetone. The product is then dried in vacuo over phosphorus pentoxide. 190 to 195 g. of Benzacyl are thus obtained, having a melting point of 154–156° C. The yield, based on the amount of acetylsalicyloyl chloride used, is 78–81% of theory.

The anthranilic acid hydrochloride which separated out during the reaction weighs 130 g. when dry. It is dissolved in water and the aqueous solution is treated hot with sodium bisulphite and decolourising charcoal; the mixture is filtered and neutralised cold with a 5 N solution of NaOH until a pH of 5 is reached. Finally about 80 g. of dry anthranilic acid are recovered (melting point 143–145° C.), which may be reused in the reaction.

If desired, the filtrate from the separation of the Benzacyl may be diluted with water until complete precipitation is achieved. A further 10 to 15 grams of crude Benzacyl may thus be obtained, the purification of which is possible but difficult.

The anti-inflammatory, analgesic and antipyretic effectiveness of Benzacyl are shown by the following pharmacological tests, in comparison with acetylsalicylic acid which is well known to have these properties.

TOXICITY

Acute toxicity

The two products were administered subcutaneously at different dosages (the Benzacyl as an oily solution, the acetylsalicylic acid as an aqueous solution of its sodium salt) to groups of 30 rats of average weight 150 g. coming from the same brood. The mortality of the animals during the 72 hours following the treatment was as shown in the following table:

TABLE 1

| Number of rats | Compound tested | Dosage, mg./kg. | Number of dead animals | Percent mortality |
|---|---|---|---|---|
| 30 | Benzacyl | 500 | 12 | 40 |
| 30 | do | 700 | 17 | 56.6 |
| 30 | do | 900 | 22 | 73 |
| 30 | Acetylsalicylic acid | 300 | 9 | 30 |
| 30 | do | 500 | 15 | 50 |
| 30 | do | 700 | 19 | 63.3 |

The LD$_{50}$ was 650 mg./kg. for Benzacyl and 506 mg./kg. for acetylsalicylic acid.

Chronic toxicity

Chronic toxicity tests were carried out to establish, in comparison with acetylsalicylic acid, the gastric tolerance of Benzacyl and its effect on the blood picture.

Gastric tolerance

In two groups of 10 rats, to each rat was administered orally, by a gastric probe, a dose of 50 mg./kg. of Benzacyl (first group) and 50 mg./kg. of acetylsalicylic acid (second group) daily for 5 consecutive days. At the end of the treatment the animals were killed and the stomach wall was examined in order to detect any changes. In the group treated with acetylsalicylic acid the stomach wall showed hyperaemia in all the animals treated. In three animals one or two ulcers of 1 mm. size were found. In the group treated with Benzacyl hyperaemia of the gastric wall was only found in five animals out of ten.

Effect on the blood picture

Two groups each of ten rats were treated subcutaneously for ten consecutive days with Benzacyl or with acetylsalicylic acid at a dosage of 25 mg./kg. Before and after treatment, a blood sample (0.5 cm.³) was taken from each rat and the concentration of haemoglobin therein was determined (by the Sahli method), as well as the number of white corpuscles per mm.³ and the leucocyte formula. The results are shown in Table 2. These results show that acetylsalicylic acid causes an anaemic condition even in the indicated dosages, whilst Benzacyl at the same dosages does not change the blood picture.

TABLE 2.—CHRONIC TOXICITY OF BENZACYL AND ACETYLSALICYLIC ACID

| | Compound tested | Dosage (mg./kg.) | Before treatment | After treatment |
|---|---|---|---|---|
| Haemoglobin, percent | Benzacyl | 25 | 90±5.4 | 89±7.2 |
| Red corpuscles ×10³ | do | 25 | 9,120±650 | 8,979±720 |
| White corpuscles ×10³ | do | 25 | 19.8±3.1 | 20.1±4 |
| Lymphocytes | do | 25 | 68.4±2.5 | 73±3.1 |
| Monocytes | do | 25 | 3.1±1 | 2.8±1.2 |
| Eosinophiles | do | 25 | 0.4±0.2 | 0.5±0.1 |
| Basophiles | do | 25 | 0.9±0.2 | 1±0.3 |
| Neutrophiles | do | 25 | 28±1 | 23±2 |
| Haemoglobin, percent | Acetylsalicylic acid | 25 | 91±3.5 | 75±2.1 |
| Red corpuscles ×10³ | do | 25 | 9,200±746 | 6,300±310 |
| White corpuscles ×10³ | do | 25 | 20±5.2 | 21±3.4 |
| Lymphocytes | do | 25 | 70±0.6 | 80±1.1 |
| Monocytes | do | 25 | 4±0.3 | 3±1.2 |
| Eosinophiles | do | 25 | 0.3±0.1 | 0.5±0.1 |
| Basophiles | do | 25 | 0.6±0.2 | 0.8±0.3 |
| Neutrophiles | do | 25 | 24±2.1 | 21±3 |

ANTIPYRETIC EFFECT

Ten rabbits were kept without food for 12 hours. After taking their temperature rectally, an 0.2% suspension of bakers' yeast in physiological saline, at a dosage of 1 cm.³/kg. was administered to them subcutaneously. At the same time Benzacyl in an oily solution was subcutaneously administered to two rabbits at a dosage of 100 mg./kg., and to two other rabbits at a dosage of 50 mg./kg. Two other pairs of rabbits were similarly treated with acetylsalicylic acid. Two rabbits were treated with physiological saline. The temperature of each rabbit was taken rectally every two hours up to the sixth hour. The results are shown in Table 3. These results show that Benzacyl has an antipyretic effect which is notably greater than that of acetylsalicylic acid (twice as great in an equal dosage).

TABLE 3.—ANTIPYRETIC EFFECT OR BENZACYL AND OF ACETYLSALICYLIC ACID

| Number of rabbits | Compound tested | Dosage | Initial temperature, °C. | After 2 hours, deg. | After 4 hours, deg. | After 6 hours, deg. |
|---|---|---|---|---|---|---|
| 1 | Physiological saline only | 2 ml | 38.5 | 39.5 | 40.3 | 40.6 |
| 2 | do | 2 ml | 38.3 | 39.6 | 40.4 | 40.2 |
| 3 | Acetylsalicylic acid | 100 mg | 38.3 | 38.4 | 38.8 | 38.6 |
| 4 | do | 100 mg | 38.7 | 39.0 | 39.1 | 39.0 |
| 5 | do | 50 mg | 38.1 | 39.2 | 39.6 | 39.4 |
| 6 | do | 50 mg | 38.4 | 38.9 | 39.1 | 39.1 |
| 7 | Benzacyl | 100 mg | 38.9 | 38.1 | 37.4 | 37.5 |
| 8 | do | 100 mg | 38.6 | 38.0 | 37.2 | 37.3 |
| 9 | do | 50 mg | 38.6 | 38.7 | 38.9 | 38.9 |
| 10 | do | 50 mg | 38.2 | 38.2 | 38.6 | 38.6 |

ANTI-INFLAMMATORY EFFECT

The formaldehyde oedema test was used. The volume of the two rear paws of 50 albino rats of average weight 150 g. was measured using a differential volume measuring device. Ten animals had Benzacyl in oily solution administered to them at a dosage of 100 mg./kg. Ten other animals had the same compound administered to them at a dosage of 50 mg./kg. Ten further animals had acetylsalicylic acid administered to them at a dosage of 60 mg./kg. and ten other animals had the same compound administered at a dosage of 30 mg./kg. Finally ten animals were used for comparison purposes and treated with a physiological solution. (A dosage of 60 mg./kg. of acetylsalicylic acid is equimolar with the dosage of 100 mg./kg. of Benzacyl, whilst a dosage of 30 mg./kg. of acetylsalicylic acid is equimolar with the dosage of 50 mg./kg. of Benzacyl.)

Fifteen minutes after the subcutaneous administration of these substances, all the animals were injected with 0.1 cm.³ of a 1% solution of formaldehyde in the plantar aponeurosis of the right rear paw. The volume of the paws was determined 30 minutes, 2 hours and 4 hours after the administration of the formaldehyde. The results, expressed as average values for each group, are given in Table 4 below. Benzacyl has an anti-inflammatory effect greater than that of acetylsalicylic acid at the same dosage.

ance in 5 of the patients, while none of them showed any intolerance with the Benzacyl.

TABLE 4.—ANTI-INFLAMMATORY EFFECT OF BENZACYL COMPARED WITH ACETYLSALICYLIC ACID

| Number of rats | Compound tested | Dosage, mg./kg. | Volume of right paw | | | | Increase in volume percent[1] | | |
|---|---|---|---|---|---|---|---|---|---|
| | | | 0 | 30 mins. | 2 hrs. | 4 hrs. | ½ hr. | 2 hrs. | 4 hrs. |
| 10 | 10 ml. of physiological solution. | | 1.3±0.2 | 1.7±0.4 | 2.3±0.5 | 2.3±0.5 | 33 | 76 | 76 |
| 10 | Acetylsalicylic acid | 60 | 1.2±0.4 | 1.4±0.5 | 1.6±0.6 | 1.8±0.4 | 16 | 33 | 36 |
| 10 | do | 30 | 1.2±0.3 | 1.5±0.3 | 2.0±0.8 | 2.1±0.4 | 25 | 66 | 76 |
| 10 | Benzacyl | 100 | 1.2±0.3 | 1.3±0.4 | 1.4±0.5 | 1.4±0.6 | 8 | 16 | 16 |
| 10 | do | 50 | 1.3±0.4 | 1.5±0.3 | 1.6±0.2 | 1.7±0.2 | 15 | 23 | 30 |

[1] The increase in volume is given as a percentage of the initial volume.

ANALGESIC EFFECT

The analgesic effect was studied using the method of Reinhard and Beer. The tail of the rats was stimulated with a current of variable intensity and the pain threshold of the animals was determined. The analgesic effect of the substance tested is expressed as the percentage increase in the intensity of the current necessary to cause the same pain reaction in the animals. The results are shown in Table 5. These results show that Benzacyl has, on an equal weight basis, an activity 1.7 times greater than that of acetylsalicylic acid and, on an equimolar basis, an activity 2.7 times greater than acetylsalicylic acid.

TABLE 5

| Number of rats | Compound tested | Minimum dosage, mg./kg. | Reduction in percent of pain sensitivity |
|---|---|---|---|
| 10 | Acetylsalicylic acid | 100 | 20 |
| 10 | Benzacyl | 60 | 25 |

The invention includes within its scope pharmaceutical compositions comprising, in assocation with a pharmaceutically acceptable carrier, N-(acetylsalicyl)anthranilic acid or a non-toxic pharmaceutically acceptable salt thereof, preferably in an amount from 0.5 to 99% by weight of the composition. Such compositions may be made up in a form suitable for oral, parenteral or rectal administration using conventional diluents and excipients which are compatible with the active ingredient. Preferably, however, the compositions are in a form suitable for oral administration, e.g. tablets, pills, capsules, granules, syrups or elixirs. Examples of such compositions are as follows:

EXAMPLE II

Benzacyl 500 mg., starch 4 mg., gum arabic 4 mg. and magnesium stearate 1 mg., are mixed together and then compressed into a tablet. A suitable dosage is 2–4 of these tablets per day given orally, i.e. 1–2 g. of Benzacyl per day, for a normal patient.

EXAMPLE III

Benzacyl sodium salt 14 g., glycerine 100 ml., sucrose 300 g., flavouring agent 30 ml., ethyl alcohol 50 ml. and distilled water to 1000 ml. are made up into a homogeneous syrup. It may be administered at the rate of two spoonfuls (30 ml.) 3–5 times a day, i.e. 1.26 to 2.10 g. of Benzacyl per day, for a normal patient.

The anti-inflammatory, analgesic and anti-pyretic effects of Benzacyl have been tested clinically in comparison with acetylsalicylic acid, using compositions such as those described above, in the following tests.

TOLERANCE

Acetylsalicyclic acid was administered to 20 patients at the rate of 2 tablets (each containing 60 mg. of active principle) every 12 hours for 3 days. Then, to the same patients, tablets of Benzacyl were administered at the rate of one tablet (500 mg.) every eight hours for three days. The acetylsalicyclic acid provoked gastric intoler-

EFFICACY

To 8 patients suffering from neuralgic pain caused by cervical arthritic-arthros, two tablets of acetylsalicylic acid (a total of 1 g.) were administered every day for three days, and the effect on the pain observed. Then, on the same patients, three tablets of Benzacyl (1.5 g. in all) were administered daily for three days and the effect on the pain observed. The results are given in the following Table 6.

TABLE 6

| Patient No. | Acetylsalicylic acid | Benzacyl |
|---|---|---|
| 1 | ++++ | ++++ |
| 2 | ++ | +++ |
| 3 | +++ | +++ |
| 4 | Intolerance | +++ |
| 5 | Intolerance | +++ |
| 6 | ++ | ++ |
| 7 | ++ | + |
| 8 | ++++ | +++ |

++++: Excellent effort. +++: Good effect. ++: Distinct effect. +: Mediocre effect.

To seven patients showing neuralgic pain caused by lumbo-sacral arthritic-arthrosis, three tables of Benzacyl (1.5 g. in all) were administered daily for a period of three days. To the same patients, two tablets of acetylsalicyclic acid (1 g. in all) were administered every day for three days. The results are given in Table 7.

TABLE 7

| Patient No. | Benzacyl | Acetylsalicylic acid |
|---|---|---|
| 1 | ++++ | Intolerance. |
| 2 | + | ++ |
| 3 | +++ | Intolerance. |
| 4 | +++ | +++ |
| 5 | ++ | Intolerance. |
| 6 | +++ | ++++ |
| 7 | ++++ | ++++ |

To five patients showing fever caused by influenza not complicated by local manifestations, Benzacyl was administered for three days at a dose of three tablets (1.5 g. in all) each day. The following results were obtained.

TABLE 8

| Patient No. | Fever controlled in— | Diaphoresis |
|---|---|---|
| 1 | 12 hours | ++++ |
| 2 | 24 hours | + |
| 3 | 24 hours | +++ |
| 4 | 48 hours | + |
| 5 | 48 hours | ++ |

The results reported in Tables 6-8 show that Benzacyl when administered in a daily oral dose of 1.5 g., has analgesic effects comparable with those of acetylsalicylic acid administered at a dose of 1 g., but with the advantage of better tolerance. The same dosage gives useful antipyretic and diaphoretic effects. For an average patient, daily oral doses of Benzacyl of from 1-2 g. generally give good results.

I claim:
1. N-(acetylsalicyl)anthranilic acid.
2. A non-toxic, pharmaceutically acceptable salt of N-(acetylsalicyl)anthranilic acid.

References Cited

UNITED STATES PATENTS 3,288,844  11/1966  Hsi ---------------- 260—480

OTHER REFERENCES

Chem. Abstracts, vol. 60, pp. 12564h–12565e (1964) city both Bostrom et al. and Whitehouse.

JAMES A. PATTEN, Primary Examiner

U.S. Cl. X.R.
260—544; 424—230